(12) United States Patent
Wang

(10) Patent No.: US 8,201,066 B1
(45) Date of Patent: Jun. 12, 2012

(54) DISK DRIVE COMPRISING A TRELLIS DETECTOR HAVING A READ SIGNAL WHITENER IN THE ACS CIRCUIT

(75) Inventor: Alvin J. Wang, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1111 days.

(21) Appl. No.: 12/058,540

(22) Filed: Mar. 28, 2008

(51) Int. Cl.
*G06F 11/00* (2006.01)
(52) U.S. Cl. .................................................. 714/796
(58) Field of Classification Search .................. 714/796, 714/795
See application file for complete search history.

(56) References Cited

U.S. PATENT DOCUMENTS

| | | | |
|---|---|---|---|
| 5,321,559 A | 6/1994 | Nguyen et al. | |
| 5,341,249 A | 8/1994 | Abbott et al. | |
| 5,583,706 A | 12/1996 | Dudley et al. | |
| 5,588,011 A | 12/1996 | Riggle | |
| 5,606,464 A | 2/1997 | Agazzi et al. | |
| 5,822,143 A | 10/1998 | Cloke et al. | |
| 5,841,601 A | 11/1998 | Fisher | |
| 6,249,553 B1 | 6/2001 | Honma | |
| 6,438,164 B2 | 8/2002 | Tan et al. | |
| 6,449,320 B1 | 9/2002 | Lindoff | |
| 6,516,443 B1 | 2/2003 | Zook | |
| 6,532,272 B1 | 3/2003 | Ryan et al. | |
| 6,594,094 B2 | 7/2003 | Rae et al. | |
| 6,674,816 B2 | 1/2004 | Shieh | |
| 6,741,645 B2 | 5/2004 | Tan et al. | |
| 6,970,522 B1 * | 11/2005 | Morling et al. | 375/341 |
| 7,017,104 B1 | 3/2006 | Chen et al. | |
| 7,076,006 B2 | 7/2006 | Fujiwara et al. | |
| 7,165,211 B2 | 1/2007 | Stein et al. | |
| 7,190,740 B2 | 3/2007 | Chu et al. | |
| 7,194,029 B2 | 3/2007 | Agazzi et al. | |
| 7,231,001 B2 | 6/2007 | Aziz | |
| 7,263,134 B2 | 8/2007 | Agazzi et al. | |
| 7,263,652 B2 | 8/2007 | Zaboronski et al. | |
| 7,788,572 B1 * | 8/2010 | Ulriksson | 714/795 |
| 2002/0154430 A1 | 10/2002 | Rae | |
| 2004/0196897 A1 | 10/2004 | Tan et al. | |
| 2005/0226316 A1 * | 10/2005 | Higashino et al. | 375/233 |
| 2007/0201585 A1 | 8/2007 | Feng | |

* cited by examiner

*Primary Examiner* — Scott Baderman
*Assistant Examiner* — Yair Leibovich

(57) ABSTRACT

A disk drive is disclosed comprising a disk, a head actuated over the disk to generate a read signal, and a trellis detector for detecting an estimated data sequence from the read signal. The trellis detector comprises a sampling device operable to sample the read signal to generate a sequence of signal sample values, and a plurality of add/compare/select (ACS) circuits each corresponding to a state in a trellis. Each ACS circuit comprises a first and second branch metric calculators for computing first and second branch metrics in response to first and second errors adjusted in response to first and second deltas that compensate for a distortion in the read signal.

20 Claims, 10 Drawing Sheets

STATE A

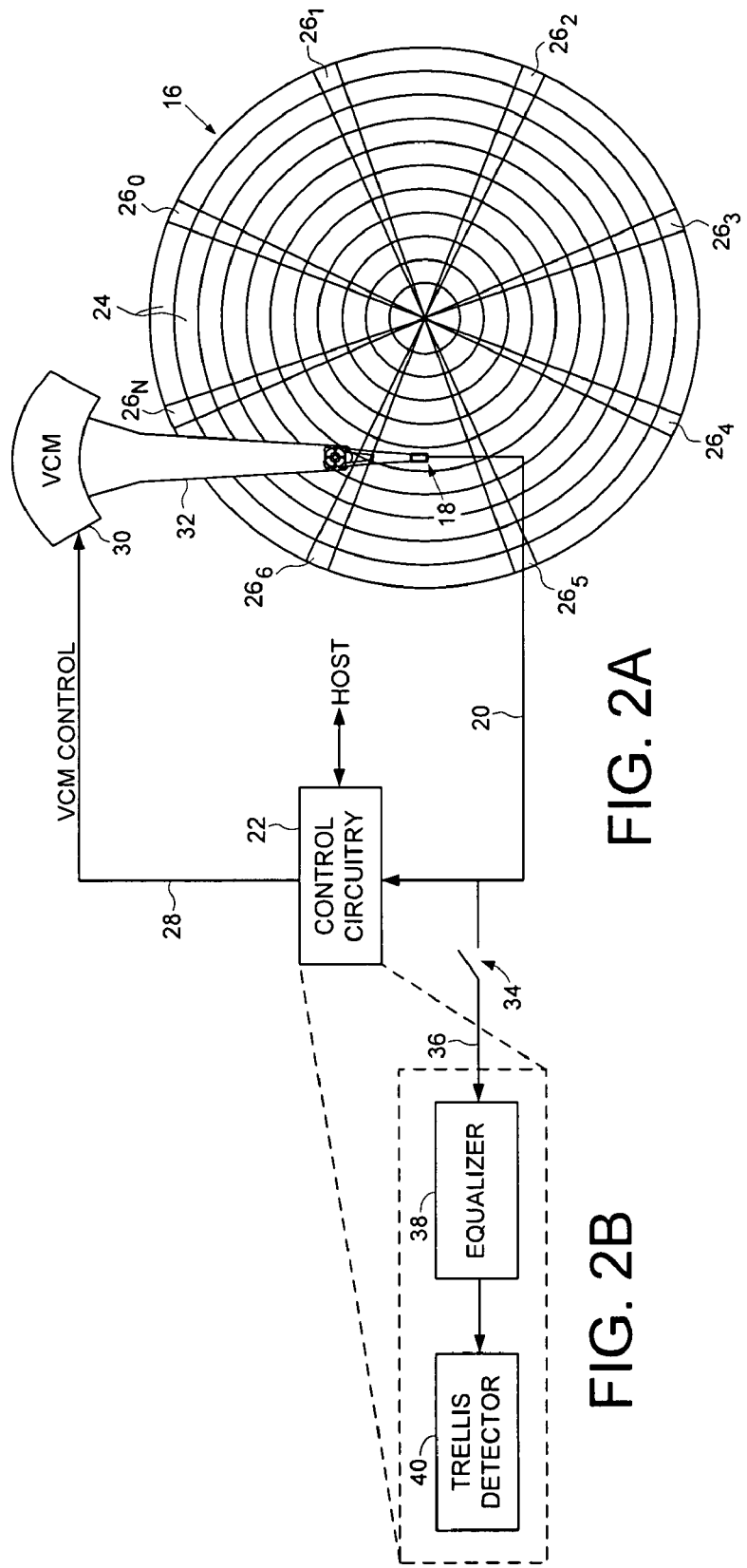

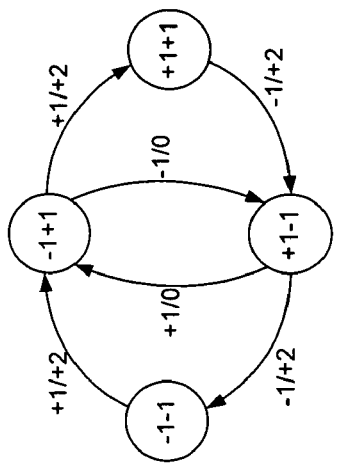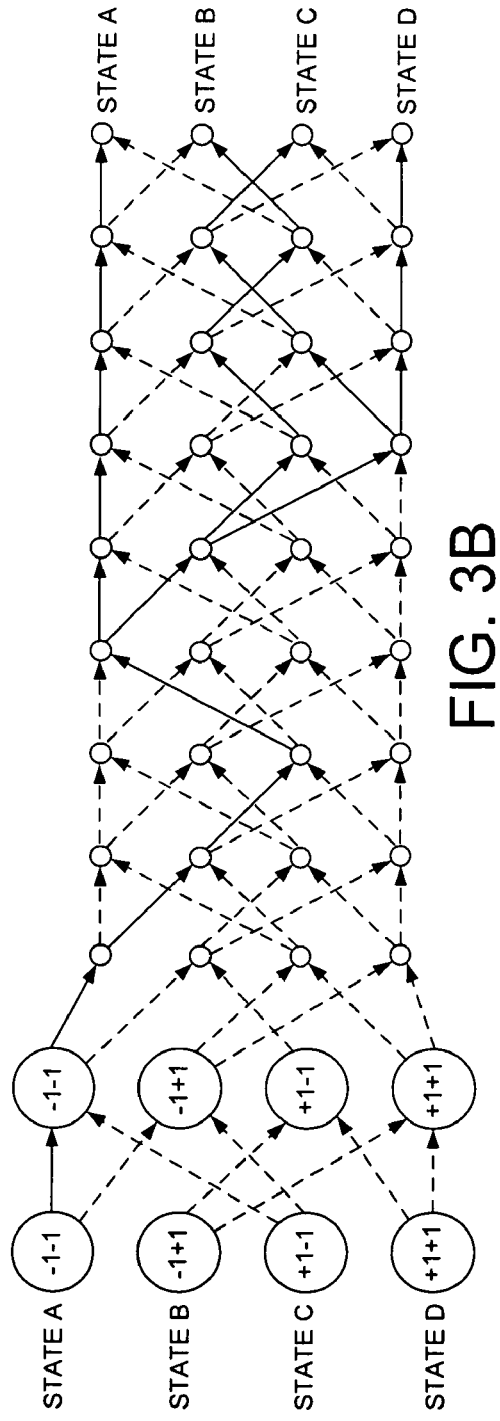
FIG. 3A (Prior Art)
FIG. 3B (Prior Art)

DISK DRIVE COMPRISING A TRELLIS DETECTOR HAVING A READ SIGNAL WHITENER IN THE ACS CIRCUIT

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

FIG. 1 shows a prior art disk format 4 as comprising a number of data tracks 6 defined by servo sectors $2_0$-$2_N$ recorded around the circumference of each data track.

Each servo sector 2, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 2, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

Data is typically written to data sectors within a data track by modulating the write current of a write element, for example, using a non-return to zero (NRZ) signal, thereby writing magnetic transitions onto the disk surface. A read element (e.g., a magnetoresistive (MR) element) is then used to transduce the magnetic transitions into a read signal that is demodulated by a read channel. The recording and reproduction process may be considered a communication channel, wherein communication demodulation techniques may be employed to demodulate the read signal.

A common demodulation technique employed in disk drives is known as partial response maximum likelihood (PRML), wherein the recording channel is equalized into a desired partial response (e.g., PR4, EPR4, etc.), the resulting read signal sampled, and the signal sample values demodulated using a ML sequence detector. The ML sequence detector is commonly implemented using the well known Viterbi sequence detector which attempts to find the minimum distance sequence (in Euclidean space) through a trellis. The accuracy of a Viterbi sequence detector matches a true ML sequence detector only if the signal noise is time invariant (data independent) and white (statistically independent) with a Gaussian probability distribution. Any deviation of the signal noise due, for example, to a DC offset or miss-equalization, reduces the accuracy of the Viterbi sequence detector.

BRIEF DESCRIPTION OF THE DRAWINGS

FIG. 2A shows a disk drive according to an embodiment of the present invention comprising a head actuated over the disk, and control circuitry.

FIG. 2B shows an embodiment of the present invention wherein the control circuitry comprises an equalizer and a trellis detector.

FIG. 3A shows a prior art state transition diagram for a PR4 read channel.

FIG. 3B shows a trellis corresponding to the PR4 read channel as well as example survivor sequences through the trellis.

DETAILED DESCRIPTION OF EMBODIMENTS OF THE INVENTION

Figure 1:
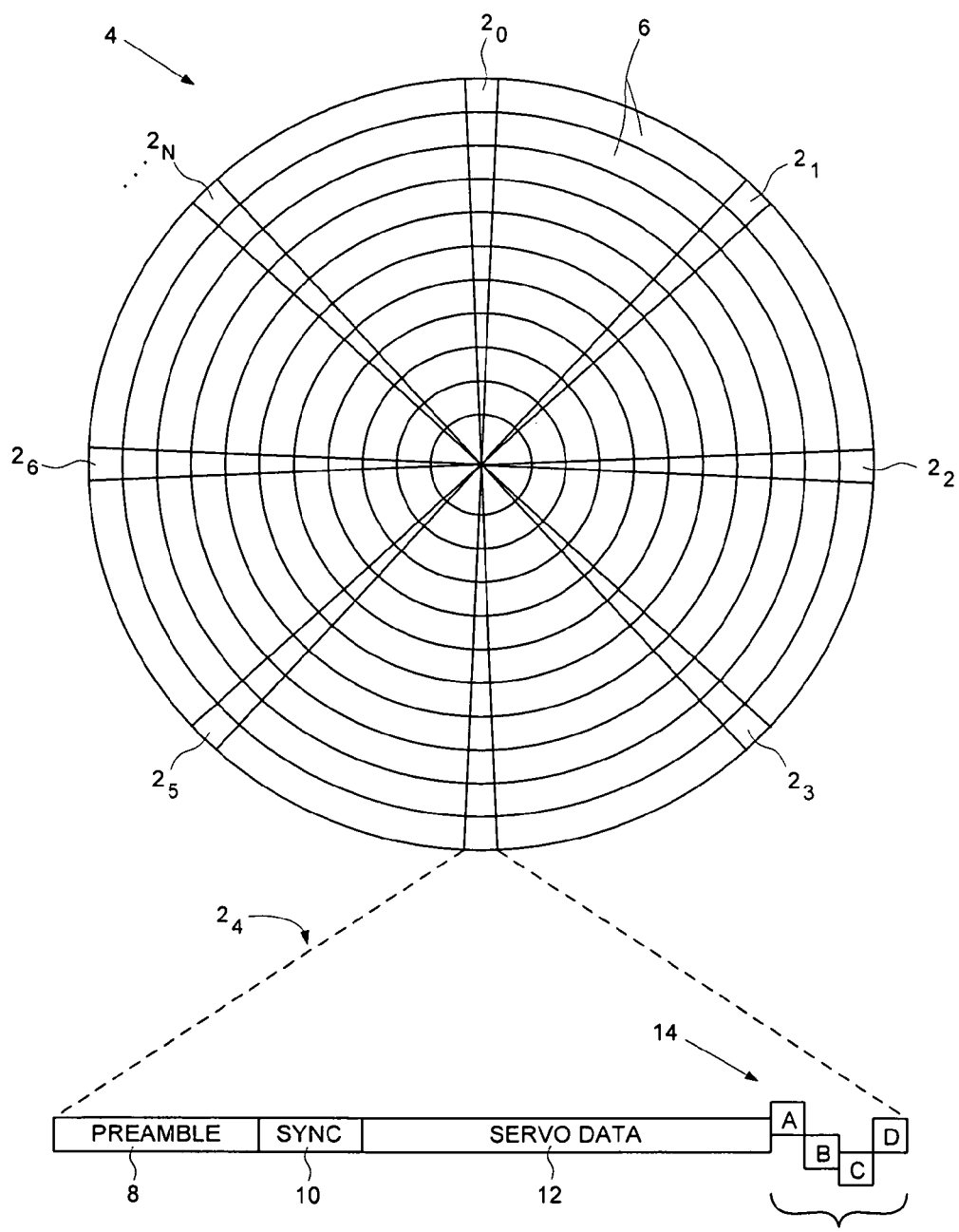
FIG. 1 shows a prior art disk format comprising a plurality of data tracks defined by a plurality of servo sectors.

FIG. 2A shows a disk drive according to an embodiment of the present invention comprising a disk 16 and a head 18 actuated over the disk to generate a read signal 20. The disk drive further comprises control circuitry 22 for processing the read signal 20 in order to demodulate data sectors recorded on the disk, wherein in the embodiment of FIG. 2A, the data sectors are recorded in data tracks 24 defined by servo sectors $26_0$-$26_N$. The control circuitry 22 demodulates the servo sectors $26_0$-$26_N$ into a position error signal (PES) which is filtered with a suitable compensation filter to generate a control signal 28 applied to a voice coil motor (VCM) 30. The VCM 30 rotates an actuator arm 32 in a direction that reduces the PES.

FIG. 2B shows an embodiment of the present invention wherein the control circuitry 22 comprises a sampling device 34 (e.g., an analog-to-digital converter) for sampling the read signal 20 to generate a sequence of signal sample values, and an equalizer 38 for equalizing the signal sample values 36 into a suitable partial response (e.g., PR4, EPR4, etc.). A trellis detector 40 processes the equalized signal samples to detect an estimated data sequence representing data recorded on the disk. The trellis detector 40 may comprise any suitable detector, such as a Viterbi detector, or an iterative detector, such as a Turbo code decoder.

FIG. 3A shows a prior art state transition diagram for a PR4 read channel, wherein each state is represented by the previous two NRZ bits and each state transition is represented by the next NRZ bit and corresponding signal sample value. FIG. 3B shows a PR4 trellis corresponding to the PR4 state transition diagram, including a plurality of survivor sequences (solid lines) through the trellis which eventually merge into a single survivor sequence output by the trellis detector 40.

Figure 4:
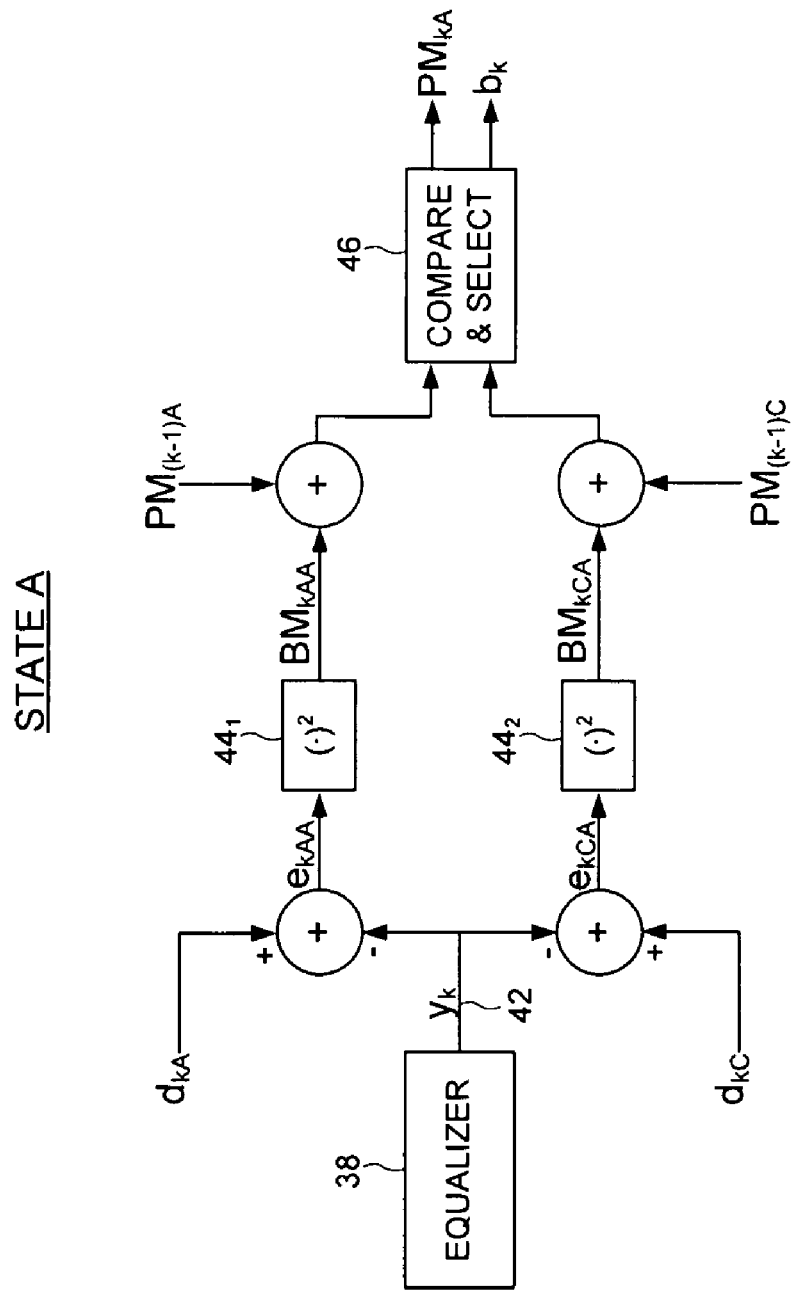
FIG. 4 shows a prior art add/compare/select (ACS) circuit for implementing the trellis detector.

FIG. 4 shows a prior art ACS circuit for computing the branch metrics for state A of the PR4 trellis in FIG. 3B, and for selecting the path metric having the minimum distance (e.g., minimum Euclidean distance). The signal sample values 42 output by the equalizer 38 are subtracted from the expected sample values $d_{kA}$ and $d_{kC}$ corresponding to the two branches ending in state A to generate respective error values $e_{kAA}$ and $e_{kCA}$. The error values are squared by squaring circuits 44₁ and 44₂ to generate respective branch metrics $BM_{kAA}$ and $BM_{kCA}$. The branch metrics are added to accumulated path metrics $PM_{(k-1)A}$ and $PM_{(k-1)C}$ corresponding to each branch, and the results are compared by a compare/select circuit 46 which selects the minimum value. The path metric $PM_{kA}$ for state A is updated with the selected value, and the NRZ bit $b_k$ corresponding to the selected branch is output.

Figure 5A:
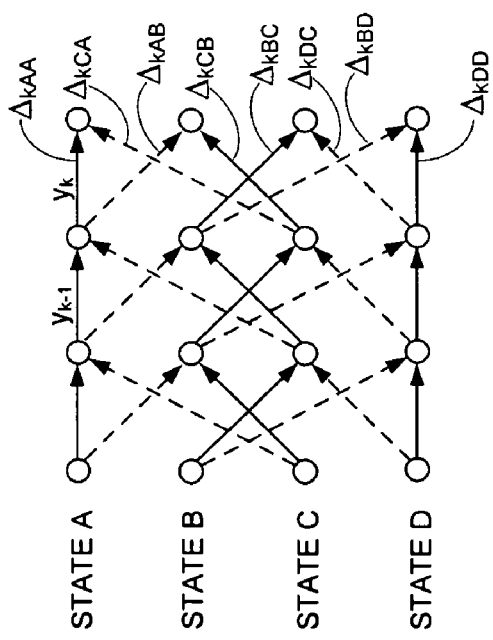
FIG. 5A shows a trellis according to an embodiment of the present invention wherein a delta ($\Delta$) is computed for eight state transition branches, such that the deltas compensate for a noise component dependent upon three non-return to zero (NRZ) bits of the read signal.
Figure 5B:
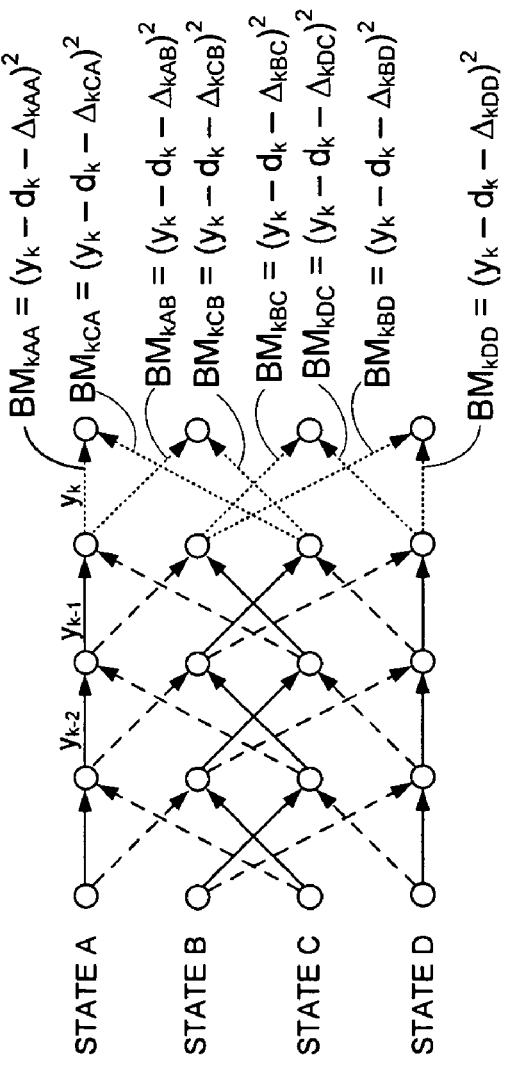
FIG. 5B shows how the deltas are used to modify each branch metric calculations according to an embodiment of the present invention.

FIG. 5A shows a PR4 trellis according to an embodiment of the present invention wherein a delta is computed for the eight state transition branches, such that the deltas compensate for a noise component dependent upon three non-return to zero (NRZ) bits of the read signal. FIG. 5B shows that when computing the branch metrics for the next state, the deltas are used to adjust the corresponding error values prior to squaring the error values. The deltas may represent any suitable noise component in the read signal, such as a DC offset or an intersymbol interference (isi).

Figure 6:
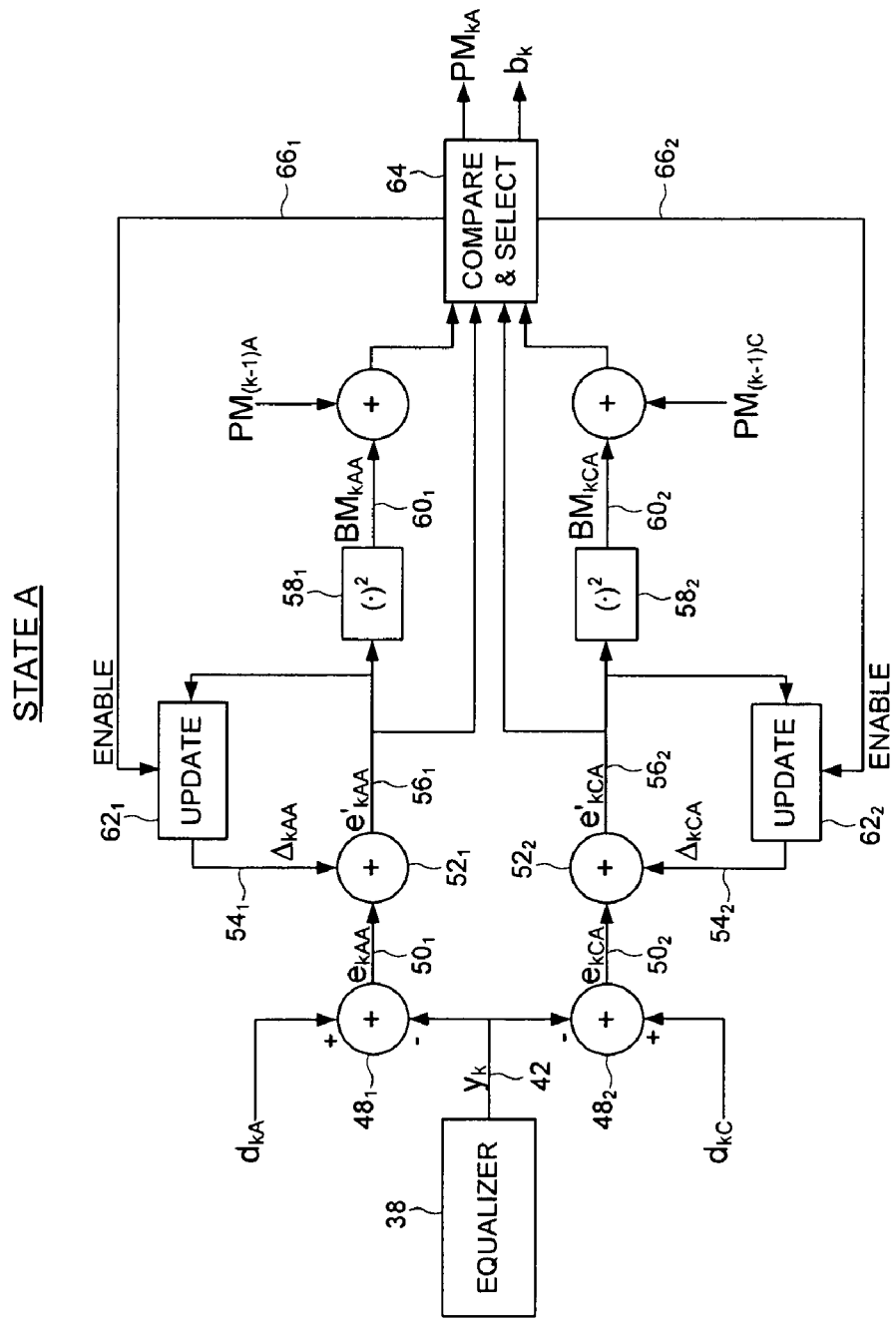
FIG. 6 shows an ACS circuit according to an embodiment of the present invention, wherein the deltas are used to generate the branch metrics and the delta corresponding to the selected branch is updated.

FIG. 6 shows an ACS circuit for implementing the PR4 trellis of FIG. 5B according to an embodiment of the present invention. The ACS circuit comprises:

a first error generator 48₁ for generating a first error 50₁ relative to one of the signal sample values 42 and a first expected value $d_{kA}$ corresponding to a first branch in the trellis;

a first adder 52₁ for adjusting the first error 50₁ in response to a first delta 54₁ to generate a first adjusted error 56₁;

a first branch metric calculator 58₁ for computing a first branch metric 60₁ in response to the first adjusted error 56₁;

a first update circuit 62₁ for updating the first delta 54₁ in response to the first adjusted error 56₁;

a second error generator 48₂ for generating a second error 50₂ relative to the signal sample value 42 and a second expected value $d_{kC}$ corresponding to a second branch in the trellis;

a second adder 52₂ for adjusting the second error 50₂ in response to a second delta 54₂ to generate a second adjusted error 56₂;

a second branch metric calculator 58₂ for computing a second branch metric 60₂ in response to the second adjusted error 56₂; and a second update circuit 62₂ for updating the second delta 54₂ in response to the second adjusted error 56₂.

In the embodiment of FIG. 6, the branch metric calculators 58₁ and 58₂ compute the square of the adjusted error such that a compare/select circuit 64 selects the minimum path metric in Euclidean space. However, any suitable metric may be employed in the embodiments of the present invention.

In one embodiment, the compare/select circuit 64 generates first and second enable signals 66₁ and 66₂ for enabling the respective update circuits 62₁ and 62₂ depending on which path metric is selected. In other words, the delta ($\Delta_{kAA}$ or $\Delta_{kCA}$) is updated only if the corresponding branch is selected by the compare/select circuit 64. In one embodiment, the ACS circuit comprises a number of registers for storing the updated deltas (e.g., eight registers in the embodiment of FIG. 5B), wherein the registers are initialized to zero at the beginning of the input sequence.

Figure 7:
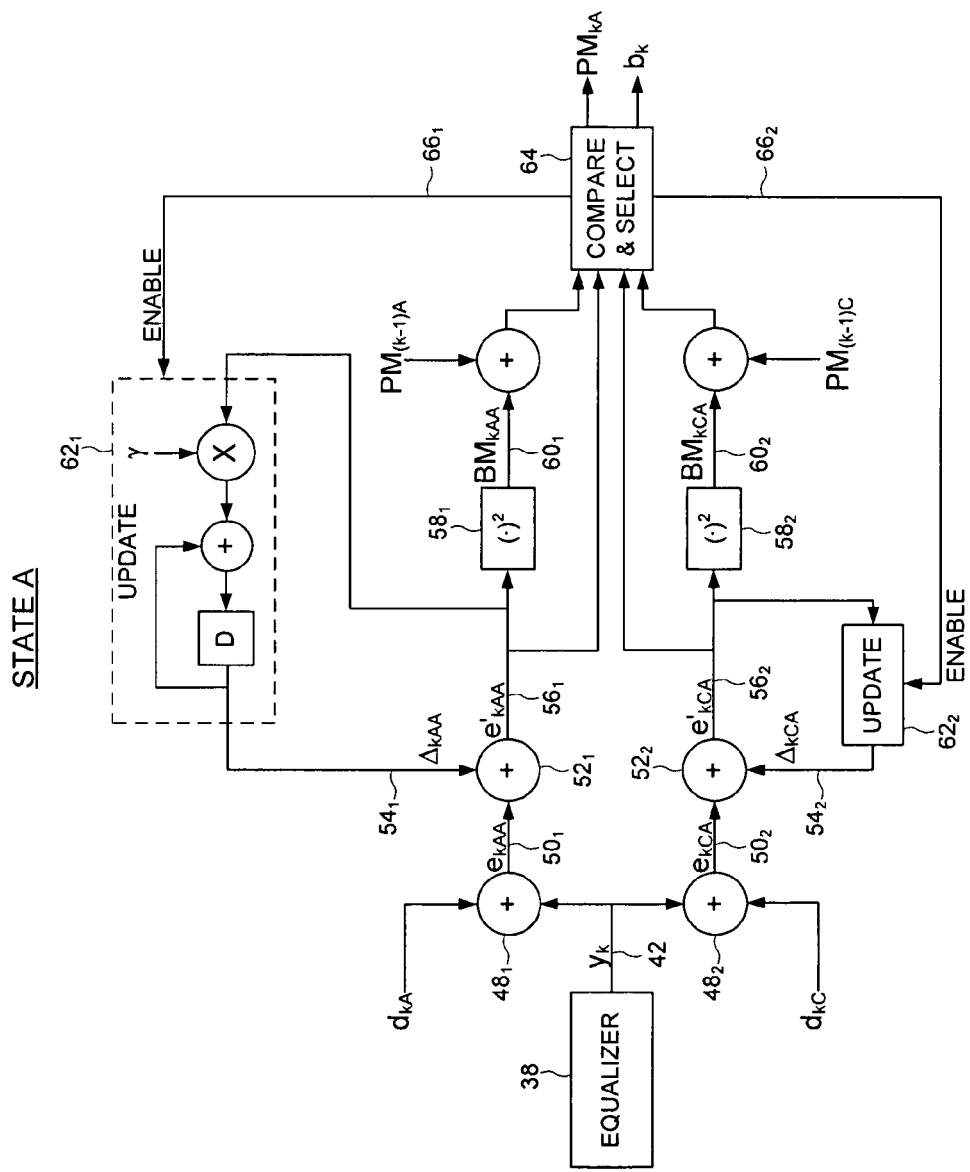
FIG. 7 shows an update circuit for updating the delta according to an embodiment of the present invention.

The deltas may represent any distortion in the read signal, and in one embodiment, the deltas represent a DC offset in the read signal. In one embodiment, the DC offset is extracted from the read signal by low pass filtering the adjusted error values corresponding to the delta. This embodiment is shown in FIG. 7 wherein the first update circuit 62₁ comprises a low pass filter represented mathematically as:

$$\Delta_k = \Delta_{k-1} + \gamma \cdot e'_k$$

where:

$\Delta_k$ is the delta;

$e'_k$ is the adjusted error; and $\gamma$ is a gain.

The value for the gain $\gamma$ may be determined in any suitable manner. In one embodiment, a nominal gain value is selected for a family of disk drives, for example, by evaluating a subset of disk drives or by running suitable simulations. In an alternative embodiment, the control circuitry 22 within each production disk drive executes a calibration procedure using suitable channel quality circuitry in order to calibrate the gain value. The calibration procedure may comprise writing/reading a test pattern, measuring a suitable metric (e.g., a bit error rate), and adjusting the gain value in order to optimize the metric. In yet another embodiment, the gain value may be adjusted in real-time while reading user data from the disk in order to adapt the gain value in a manner that optimizes a suitable metric.

Figure 8A:
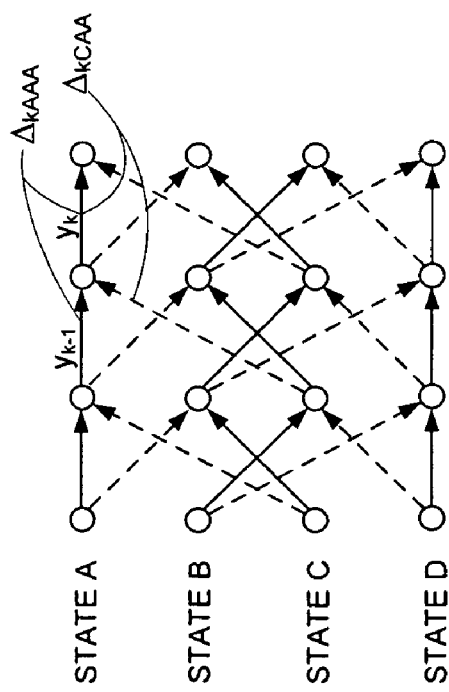
FIG. 8A shows a trellis according to an embodiment of the present invention wherein a delta is computed for sixteen state transition branches, such that the deltas compensate for a noise component of the read signal dependent upon four non-return to zero (NRZ) bits of the read signal.
Figure 8B:
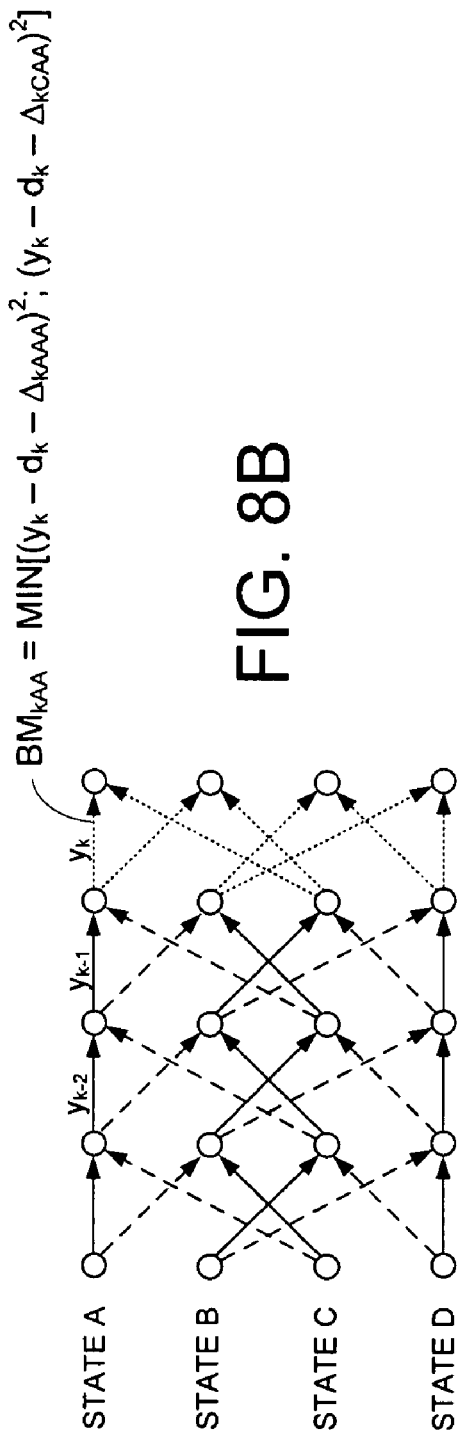
FIG. 8B shows how the deltas are used to modify each branch metric calculations according to an embodiment of the present invention.

Any suitable number of deltas may be generated based on the length of NRZ bits that may be affected by the distortion in the read signal (or the desired length to be evaluated). For example, a DC offset in the read signal may manifest itself in the error values of the trellis uniquely dependent on the sequence of NRZ bits. If the delta is dependent on the most recent three NRZ bits, then eight deltas are generated corresponding to the eight branches of a single state transition as shown in the PR4 trellis of FIG. 5A. If the delta is dependent on the most recent four NRZ bits, then sixteen deltas are generated corresponding to the sixteen branches of two state transitions. An example of a four NRZ bit embodiment for a PR4 trellis is shown in FIG. 8A wherein four delta values are generated for state A: two for the branch from state A and two for the branch from state C. The two deltas for the branch from state A represent the path from state A to state A ($\Delta_{kAAA}$) and the path from state C to state A ($\Delta_{kCAA}$) as shown in FIG. 8A. When computing the branch metric $BM_{kAA}$ for the branch from state A, two branch metrics are computed corresponding to the two delta values, and the minimum branch metric is selected as shown in FIG. 8B. A similar computation is done for the branch from state C to compute the branch metric $BM_{kCA}$, and then the two branch metrics $BM_{kAA}$ and $BM_{kCA}$ are used to generate the path metrics for state A.

The above description can be extended to any number of deltas corresponding to the number of dependent NRZ bits, where each delta corresponds to a possible path through the trellis. In addition, the above description can be extended to any number of states in the state transition diagram and corresponding trellis (e.g., EPR4, EEPR4, etc.).

Figure 9A:
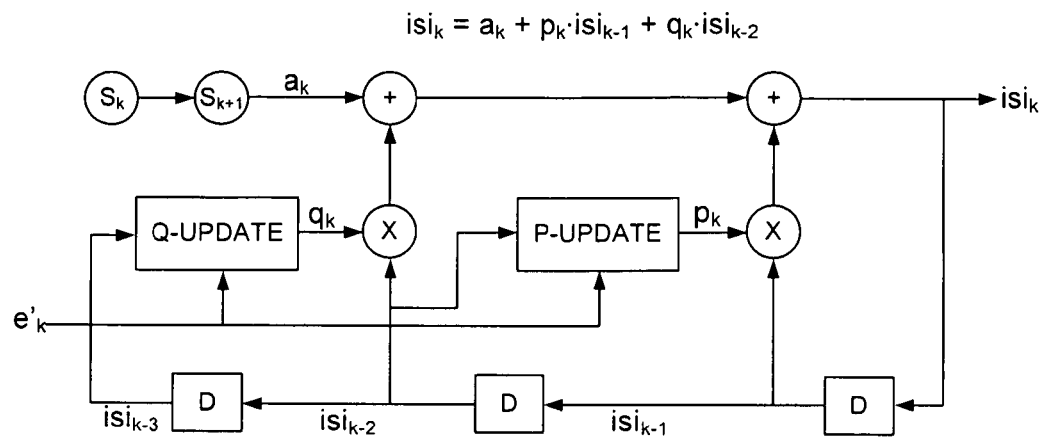
FIGS. 9A-9C show update circuitry according to an embodiment of the present invention, wherein each delta compensates for an intersymbol interference (isi).

In another embodiment of the present invention, each delta represents an intersymbol interference (isi) distortion in the read signal due, for example, to miss-equalization of the read signal. FIG. 9A shows example update circuitry for updating the delta referred to as $isi_k$. The mathematical representation of the circuitry shown in FIG. 9A is:

$$isi_k = a_k + p_k \cdot isi_{k-1} + q_k \cdot isi_{k-2} \qquad 5$$

where:
 $a_k$ is a non-return to zero (NRZ) symbol corresponding to a $k^{th}$ state transition;
 $p_k = p_{k-1} + \eta_1 \cdot e'_{k-1} \cdot isi_{k-2}$;
 $q_k = q_{k-1} + \eta_2 \cdot e'_{k-1} \cdot isi_{k-3}$; and
 $\eta_1$ and $\eta_2$ are gains.

Figure 9B:
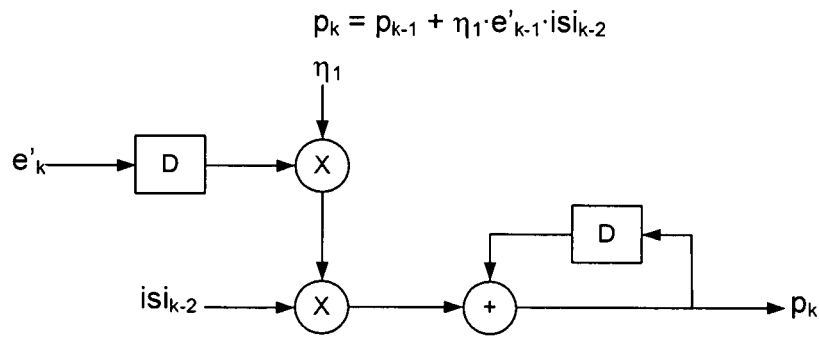
Figure 9C:
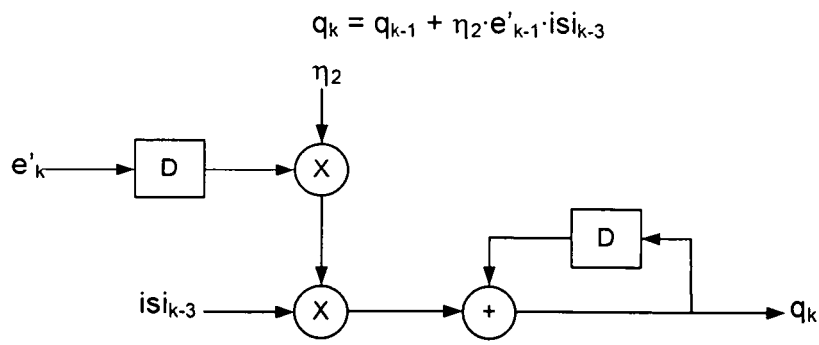

Example circuitry for generating $p_k$ is shown in FIG. 9B, and example circuitry for generating $q_k$ is shown in FIG. 9C. Similar to the gain γ described above, the values for the gains $\eta_1$ and $\eta_2$ may be determined in any suitable manner, such as nominal values for a family of disk drives, or they may be calibrated and optionally adapted by the control circuitry 22 within each production disk drive.

Figure 10:
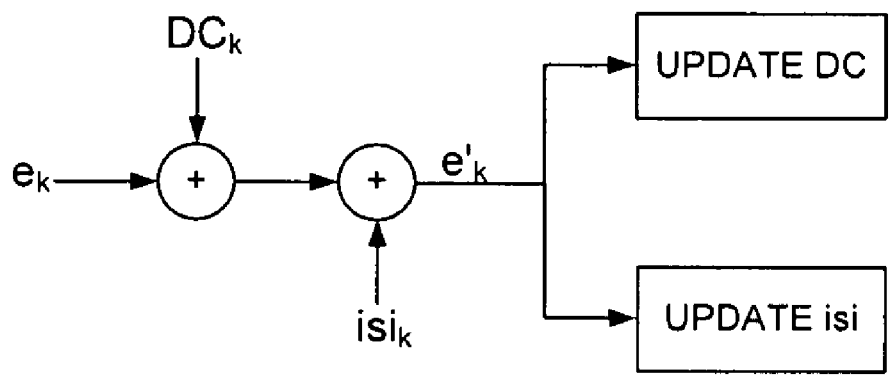
FIG. 10 shows an embodiment of the present invention wherein each delta compensates for a DC offset and an isi distortion in the read signal.

In one embodiment, the deltas corresponding to isi are used independently to adjust the corresponding error values in the ACS circuits. In another embodiment shown in FIG. 10, a delta ($DC_k$) is generated corresponding to a DC offset distortion in the read signal, and a delta ($isi_k$) is generated corresponding to an isi distortion in the read signal. Both deltas are used to adjust the error $e_k$ to generate the adjusted error $e'_k$, and the adjusted error $e'_k$ is used to update the DC delta and the isi delta as shown in FIG. 10.

Any suitable control circuitry 22 may be employed in the embodiments of the present invention, such as any suitable integrated circuit or circuits. For example, the control circuitry 22 may be implemented within a read channel integrated circuit, or in a component separate from the read channel, such as a disk controller, or certain steps described above may be performed by a read channel and others by a disk controller.

In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 22 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 16 and read into a volatile semiconductor memory when the disk drive is powered on. In yet another embodiment, the control circuitry 22 comprises suitable logic circuitry, such as state machine circuitry.

What is claimed is:

1. A disk drive comprising:
 a disk;
 a head actuated over the disk to generate a read signal;
 a sampling device operable to sample the read signal to generate a sequence of signal sample values; and
 a trellis detector for detecting an estimated data sequence from the signal sample values, the trellis detector comprising a plurality of add/compare/select (ACS) circuits each corresponding to a state in a trellis, wherein each ACS circuit comprises:
  a first error generator for generating a first error relative to a signal sample value and a first expected value corresponding to a first branch in the trellis;
  a first adder for adjusting the first error in response to a first delta to generate a first adjusted error;
  a first branch metric calculator for computing a first branch metric in response to the first adjusted error;
  a first update circuit for updating the first delta in response to the first adjusted error;
  a second error generator for generating a second error relative to the signal sample value and a second expected value corresponding to a second branch in the trellis;
  a second adder for adjusting the second error in response to a second delta to generate a second adjusted error;
  a second branch metric calculator for computing a second branch metric in response to the second adjusted error; and
  a second update circuit for updating the second delta in response to the second adjusted error.

2. The disk drive as recited in claim 1, wherein each ACS circuit is operable to:
 add the first branch metric to a first path metric corresponding to a first state to generate a first candidate path;
 add the second branch metric to a second path metric corresponding to a second state to generate a second candidate path; and
 select between the first and second candidate paths.

3. The disk drive as recited in claim 2, wherein each ACS circuit is further operable to update the delta if the corresponding candidate path is selected.

4. The disk drive as recited in claim 1, wherein the first and second update circuits update the respective deltas according to:

$$\Delta_k = \Delta_{k-1} + \gamma \cdot e'_k$$

where:
 $\Delta_k$ is the delta;
 $e'_k$ is the adjusted error; and
 γ is a gain.

5. The disk drive as recited in claim 1, wherein the first delta corresponds to a first path through the trellis and the second delta corresponds to a second path through the trellis.

6. The disk drive as recited in claim 5, wherein each ACS circuit is further operable to:
 maintain N deltas, wherein N equals a number of possible paths through the trellis ending in the state corresponding to the ACS;
 compute a branch metric for each of the N deltas;
 compute a candidate path for each branch metric; and
 select one of the candidate paths.

7. The disk drive as recited in claim 1, wherein each delta comprises a DC offset in the signal sample values.

8. The disk drive as recited in claim 1, wherein each delta comprises an intersymbol interference (isi) in the signal sample values.

9. The disk drive as recited in claim 8, wherein the isi is generated according to:

$$isi_k = a_k + p_k \cdot isi_{k-1} + q_k \cdot isi_{k-2}$$

where:
 $a_k$ is a non-return to zero (NRZ) symbol corresponding to a $k^{th}$ state transition;
 $p_k = p_{k-1} + \eta_1 \cdot e'_{k-1} \cdot isi_{k-2}$;
 $q_k = q_{k-1} + \eta_2 \cdot e'_{k-1} \cdot isi_{k-3}$; and
 $\eta_1$ and $\eta_2$ are gains.

10. The disk drive as recited in claim 9, wherein each delta further comprises a DC offset in the signal sample values.

11. A method of operating a disk drive, the disk drive comprising a disk, a head actuated over the disk to generate a read signal, and a trellis detector for detecting an estimated data sequence from the read signal, the method comprising:
- sampling the read signal to generate a sequence of signal sample values;
- generating a first error relative to a signal sample value and a first expected value corresponding to a first branch in the trellis;
- adjusting the first error in response to a first delta to generate a first adjusted error;
- computing a first branch metric in response to the first adjusted error;
- updating the first delta in response to the first adjusted error;
- generating a second error relative to the signal sample value and a second expected value corresponding to a second branch in the trellis;
- adjusting the second error in response to a second delta to generate a second adjusted error;
- computing a second branch metric in response to the second adjusted error; and
- updating the second delta in response to the second adjusted error.

12. The method as recited in claim 11, further comprising:
- adding the first branch metric to a first path metric corresponding to a first state to generate a first candidate path;
- adding the second branch metric to a second path metric corresponding to a second state to generate a second candidate path; and
- selecting between the first and second candidate paths.

13. The method as recited in claim 12, wherein one of the first and second deltas is updated if the corresponding candidate path is selected.

14. The method as recited in claim 11, wherein the first and second deltas are updated according to:

$$\Delta_k = \Delta_{k-1} + \gamma \cdot e'_k$$

where:
- $\Delta_k$ is the delta;
- $e'_k$ is the adjusted error; and
- $\gamma$ is a gain.

15. The method as recited in claim 11, wherein the first delta corresponds to a first path through the trellis and the second delta corresponds to a second path through the trellis.

16. The method as recited in claim 15, further comprising:
- maintaining N deltas, wherein N equals a number of possible paths through the trellis ending in the state corresponding to the ACS;
- computing a branch metric for each of the N deltas;
- computing a candidate path for each branch metric; and
- selecting one of the candidate paths.

17. The method as recited in claim 11, wherein each delta comprises a DC offset in the signal sample values.

18. The method as recited in claim 11, wherein each delta comprises an intersymbol interference (isi) in the signal sample values.

19. The method as recited in claim 18, wherein the isi is generated according to:

$$isi_k = a_k + p_k \cdot isi_{k-1} + q_k \cdot isi_{k-2}$$

where:
- $a_k$ is a non-return to zero (NRZ) symbol corresponding to a $k^{th}$ state transition;
- $p_k = p_{k-1} + \eta_1 \cdot e'_{k-1} \cdot isi_{k-2}$;
- $q_k = q_{k-1} + \eta_2 \cdot e'_{k-1} \cdot isi_{k-3}$; and
- $\eta_1$ and $\eta_2$ are gains.

20. The method as recited in claim 19, wherein each of the first and second deltas further comprises a DC offset in the signal sample values.

\* \* \* \* \*